(12) United States Patent
Yamamoto et al.

(10) Patent No.: US 11,355,793 B2
(45) Date of Patent: Jun. 7, 2022

(54) POWER SUPPLYING DEVICE, POWER STORAGE SYSTEM, AND CHARGING METHOD

(71) Applicant: Panasonic Intellectual Property Management Co., Ltd., Osaka (JP)

(72) Inventors: Takao Yamamoto, Nara (JP); Tomokazu Sada, Osaka (JP); Hiroshi Tenmyou, Hyogo (JP); Yukikazu Ohchi, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 328 days.

(21) Appl. No.: 16/607,316

(22) PCT Filed: Mar. 30, 2018

(86) PCT No.: PCT/JP2018/013653
§ 371 (c)(1),
(2) Date: Oct. 22, 2019

(87) PCT Pub. No.: WO2018/198668
PCT Pub. Date: Nov. 1, 2018

(65) Prior Publication Data
US 2020/0381784 A1    Dec. 3, 2020

(30) Foreign Application Priority Data

Apr. 27, 2017    (JP) .............................. JP2017-087995

(51) Int. Cl.
*H01M 10/44*    (2006.01)
*B60L 53/22*    (2019.01)
(Continued)

(52) U.S. Cl.
CPC ............. *H01M 10/44* (2013.01); *B60L 50/64* (2019.02); *B60L 53/22* (2019.02); *H01M 4/525* (2013.01);
(Continued)

(58) Field of Classification Search
CPC .. H01M 10/44; H01M 4/525; H01M 10/0525; H01M 10/46; H01M 2220/20;
(Continued)

(56) References Cited

U.S. PATENT DOCUMENTS

| | | | |
|---|---|---|---|
| 2002/0070710 A1* | 6/2002 | Yagi ...................... | H02J 7/0091 320/150 |
| 2005/0017691 A1* | 1/2005 | Aradachi .............. | H02J 7/0091 320/150 |

(Continued)

FOREIGN PATENT DOCUMENTS

| | | | |
|---|---|---|---|
| EP | 2065997 B1 * | 7/2011 | ........ H02J 7/007192 |
| JP | H7-211354 A | 8/1995 | |

(Continued)

OTHER PUBLICATIONS

International Search Report issued in corresponding International Patent Application No. PCT/JP2018/013653, dated May 5, 2018, with English translation.

*Primary Examiner* — Suresh Memula
(74) *Attorney, Agent, or Firm* — McDermott Will & Emery, LLP

(57) ABSTRACT

In this power supplying device used in this power storage system, a power supplying unit charges a battery. A control unit controls the power supplying unit so as to charge the battery in a pulsed manner, in at least a part of a charging period of the battery. The control unit extends a unit on time and a unit off time when charging in the pulsed manner, as the temperature of the battery becomes lower.

7 Claims, 6 Drawing Sheets

(51) Int. Cl.
*B60L 50/64* (2019.01)
*H01M 4/525* (2010.01)
*H01M 10/0525* (2010.01)
*H01M 10/46* (2006.01)
*H02J 7/04* (2006.01)
*H02J 7/00* (2006.01)
*B60K 6/28* (2007.10)

(52) U.S. Cl.
CPC ....... *H01M 10/0525* (2013.01); *H01M 10/46* (2013.01); *H02J 7/04* (2013.01); *B60K 6/28* (2013.01); *B60L 2210/10* (2013.01); *B60Y 2200/91* (2013.01); *B60Y 2200/92* (2013.01); *B60Y 2300/91* (2013.01); *H01M 2220/20* (2013.01); *H02J 7/00711* (2020.01)

(58) Field of Classification Search
CPC ...... B60L 53/22; B60L 50/64; B60L 2210/10; H02J 7/04; H02J 7/00711; B60K 6/28; B60Y 2200/91; B60Y 2200/92; B60Y 2300/91
USPC .......................................................... 320/139
See application file for complete search history.

(56) References Cited

U.S. PATENT DOCUMENTS

| | | | | |
|---|---|---|---|---|
| 2005/0017692 | A1* | 1/2005 | Izumi | H02J 7/007194 320/150 |
| 2005/0046393 | A1* | 3/2005 | Nakasho | H02J 7/0045 320/150 |
| 2006/0043926 | A1* | 3/2006 | Nakasho | H02J 7/0091 320/107 |
| 2006/0043928 | A1* | 3/2006 | Nakasho | H02J 7/007192 320/112 |
| 2009/0278500 | A1* | 11/2009 | To | B60L 58/27 320/134 |
| 2012/0025773 | A1* | 2/2012 | Wang | H02J 7/045 320/129 |
| 2018/0041063 | A1* | 2/2018 | Isomura | H01M 10/345 |

FOREIGN PATENT DOCUMENTS

| | | | | |
|---|---|---|---|---|
| JP | H09-149557 | A | | 6/1997 |
| JP | 2001016795 | A | * | 1/2001 |
| JP | 2002-199605 | A | | 7/2002 |
| JP | 2002-369402 | A | | 12/2002 |
| JP | 4145010 | B2 | | 9/2008 |
| JP | 2012-022955 | A | | 2/2012 |
| WO | WO-2017043723 | A1 | * | 3/2017 .......... H01M 10/613 |

* cited by examiner

CHARGING PATTERN A

CHARGING PATTERN B

AT LOW TEMPERATURE

AT HIGH TEMPERATURE

POWER SUPPLYING DEVICE, POWER STORAGE SYSTEM, AND CHARGING METHOD

CROSS-REFERENCE TO RELATED APPLICATIONS

This application is the U.S. National Phase under 35 U.S.C. § 371 of International Application No. PCT/JP2018/013653, filed on Mar. 30, 2018, which claims the benefit of Japanese Application No. 2017-087995, filed on Apr. 27, 2017, the entire contents of each are hereby incorporated by reference.

TECHNICAL FIELD

The present disclosure relates to a power supplying device, a power storage system, and a charging method for charging a battery.

BACKGROUND ART

In recent years, the demand for lithium ion batteries has expanded. Lithium ion batteries are used in various applications such as electronic device applications (for example, PCs and smartphones), in-vehicle applications (for example, EVs and PHEVs), and stationary power storage applications. In particular, the number of EVs and PHEVs that have been shipped has increased, and the demand for rapid charging of in-vehicle lithium ion batteries has thus increased. In rapid charging, it is necessary to increase the current rate, which increases the burden on the battery. Pulse charging is a method of charging with a high current while reducing the burden on the battery.

Patent Literature 1 discloses a method of avoiding a sudden increase in battery voltage that results in an increased burden on the battery by shortening the pulse on time when the battery temperature is low or the voltage rise gradient is large.

PATENT LITERATURE

Patent Literature 1: Japanese Patent No. 4145010

SUMMARY OF INVENTION

Deterioration factors of lithium ion batteries include not only a sudden increase in voltage but also heterogeneous reactions and side reactions in the electrodes. The diffusion speed of lithium ions decreases as the temperature decreases. When the temperature is low, the number of lithium ions that cannot return to the normal position during the off period of pulse charging increases, and unevenness in the concentration distribution of the lithium ions increases.

The disclosure addresses the above-described issue, and a general purpose thereof is to provide a technique for reducing the burden on a battery when pulse-charging the battery.

A power supplying device according to one embodiment of the present disclosure includes: a power supplying unit that charges a battery; and a control unit that controls the power supplying unit so as to charge the battery in a pulsed manner, in at least a part of a charging period of the battery. The control unit extends a unit on time and a unit off time when charging the battery in the pulsed manner, as the temperature of the battery becomes lower.

Optional combinations of the aforementioned constituting elements, and implementations of the invention in the form of methods, apparatuses, systems, and computer programs may also be practiced as additional modes of the present disclosure.

According to the present disclosure, it is possible to reduce the burden on a battery when pulse-charging the battery.

DESCRIPTION OF EMBODIMENTS

Figure 1:
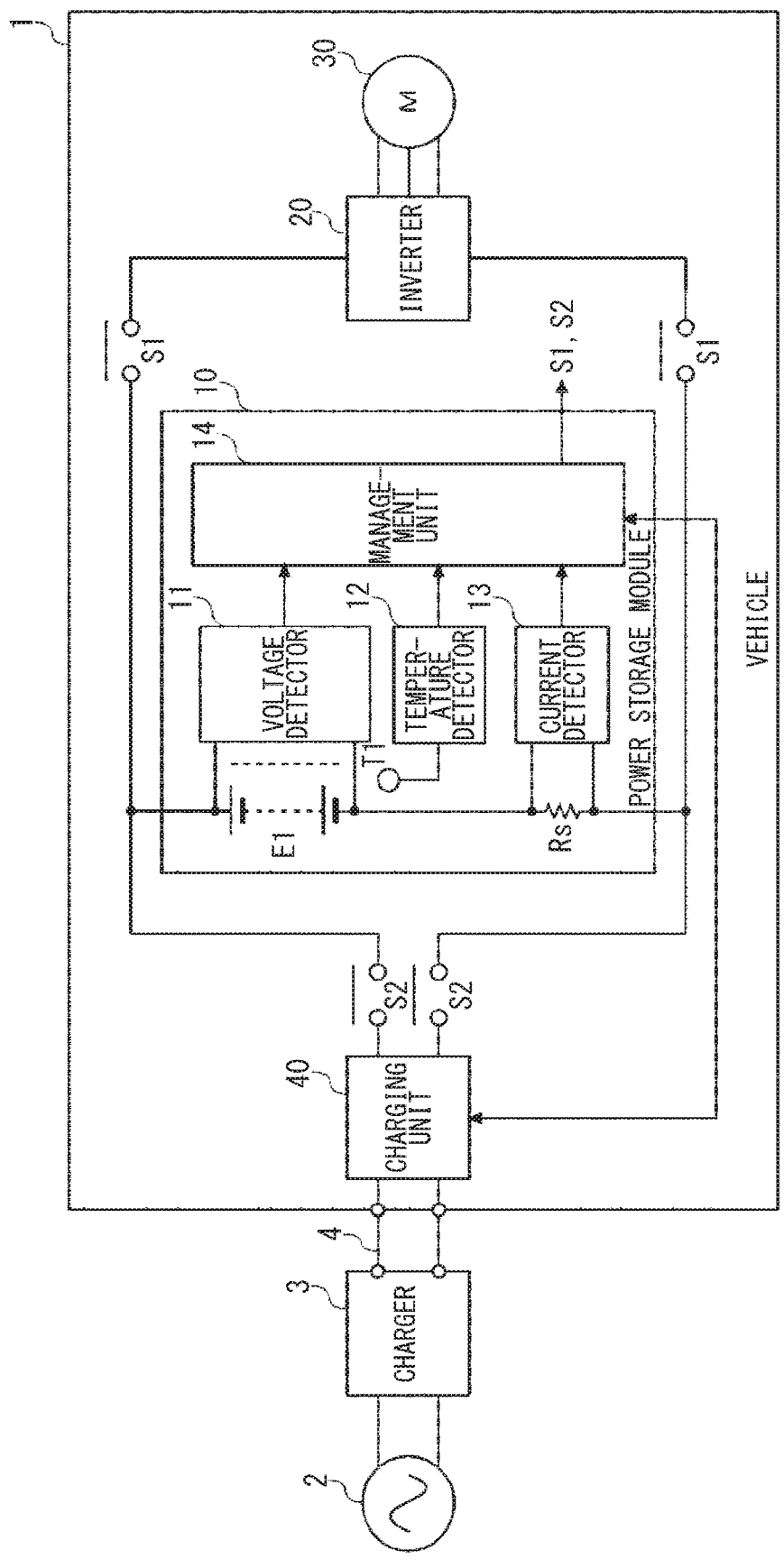
FIG. 1 is a diagram for explaining a vehicle according to an embodiment of the present disclosure.

FIG. 1 is a diagram for explaining a vehicle 1 according to an embodiment of the present disclosure. In the present embodiment, an electric vehicle (EV) or a plug-in hybrid vehicle (PHEV) that can be charged from a commercial power system (hereinafter simply referred to as system 2) is assumed as the vehicle 1.

The vehicle 1 includes a power storage module 10, an inverter 20, a motor 30, a charging unit 40, a first switch S1, and a second switch S2. The power storage module 10 includes a battery E1, a temperature sensor T1, a shunt resistor Rs, a voltage detector 11, a temperature detector 12, a current detector 13, and a management unit 14. The battery E1 is a battery for storing energy for supplying electric power to the motor 30 for traveling. The battery E1 is configured by connecting a plurality of battery cells in series or in series-parallel.

In this embodiment, it is assumed that a lithium ion battery is used for a battery cell. As a positive electrode active material of the lithium ion battery, for example, a lithium nickel composite oxide (NCA or NMC) having a high Ni ratio is used. When NCA is used, the nominal voltage is 3.6V, and when NMC is used, the nominal voltage is 3.6-3.7V. For in-vehicle use, lithium manganate is also widely used. Examples of a negative electrode active material include a carbon material, silicon, a silicon compound such as silicon oxide, and a lithium alloy containing at least one element selected from the group consisting of tin, aluminum, zinc, and magnesium. Examples of the carbon material include graphite (natural graphite, artificial graphite, etc.), amorphous carbon, and the like. As an electrolyte, a non-aqueous electrolyte that is not electrolyzed by lithium is used.

The inverter 20 converts the DC power supplied from the battery E1 into AC power and supplies the AC power to the motor 30 during power running. During regeneration, the inverter converts AC power supplied from the motor 30 to DC power and supplies the DC power to the battery E1. The motor 30 rotates according to the AC power supplied from the inverter 20 during power running. During regeneration, the motor converts rotational energy caused due to deceleration to AC power and supplies the Ac power to the inverter 20.

The first switch S1 is inserted on a wire connecting the battery E1 and the inverter 20. A contactor relay can be used for the first switch S1. When traveling, the management unit 14 controls the first switch S1 to be in an ON state (closed state) so as to electrically connect the power storage module 10 and a power system. When not traveling, the management unit 14 basically controls the first switch S1 to be in an OFF state (open state) so as to electrically disconnect the power storage module 10 from the power system.

The voltage detector 11 detects the voltage of each cell of the battery E1 and outputs the detected voltage value of each cell to the management unit 14. The shunt resistor Rs is connected in series with the battery E1. The shunt resistor Rs is a current detection element for detecting the current flowing through the battery E1. As the current detection element, a Hall element may be used instead of the shunt resistor Rs. The current detector 13 detects the value of the current flowing through the battery E1 based on the voltage across the shunt resistor Rs and outputs the detected current value to the management unit 14. A temperature sensor T1 is installed near the battery E1. For example, a thermistor can be used as the temperature sensor T1. The temperature detector 12 detects the temperature of the battery E1 based on an output signal of the temperature sensor T1 and outputs the detected temperature value to the management unit 14.

The management unit 14 can be realized by the cooperation of hardware resources and software resources or only by hardware resources. As the hardware resources, a microcomputer, DSP, FPGA, ROM, RAM, and other LSIs can be used. As the software resources, firmware and other programs can be used. The management unit 14 transmits the voltage value, current value, and temperature value of the battery E1 to the charging unit 40 as monitoring data via a communication line. Further, upon detecting an overvoltage, an undervoltage, an overcurrent, or temperature abnormality, the management unit 14 turns off the first switch S1 and the second switch S2 and protect the battery E1.

The battery E1 can be charged from a charger 3 installed outside the vehicle 1. The charger 3 and the vehicle 1 are connected by a charging cable 4. In the vehicle 1, a power supply line connected to the charging cable 4 is connected to the charging unit 40. The charging unit 40 is connected to the battery E1 via the second switch S2 and charges the battery E1 with power supplied from the charger 3. A contactor relay can also be used for the first switch S1. A semiconductor switch may be used instead of the contactor relay.

The charger 3 is installed in car dealers, service areas, commercial facilities, public facilities, and the like. The charger 3 is connected to the system 2 and supplies AC 100/200V single-phase AC power to the vehicle 1 via the charging cable 4. In the case of a commonly-used battery E1, the battery E1 can be charged to a full charge within several hours when charged with an electric current of 15 A or more. When charging the battery with a current of 7 A or less, it takes 12 hours or more for the battery to get fully charged. When charging the battery with AC 100V with a low current, the plug of the charging cable 4 may be directly inserted into a household outlet without providing the charger 3.

Figure 2:
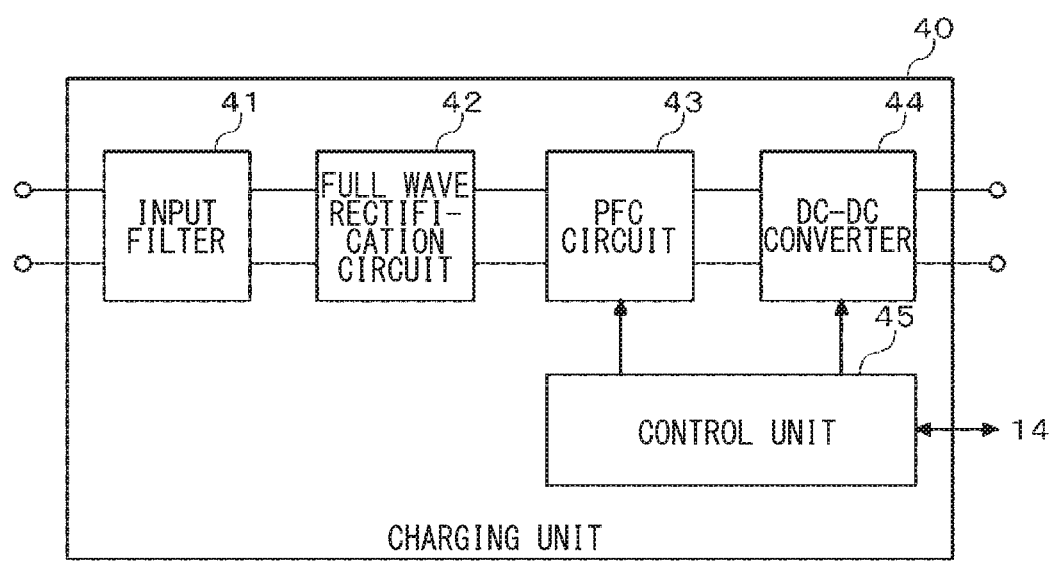
FIG. 2 is a block diagram showing a configuration example of a charging unit.

FIG. 2 is a block diagram showing a configuration example of the charging unit 40. The charging unit 40 includes an input filter 41, a full wave rectification circuit 42, a power factor correction (PFC) circuit 43, a DC-DC converter 44, and a control unit 45. The charging unit 40 constitutes a power supplying device as one functional unit that charges the battery E1.

The input filter 41 band-passes a commercial power supply frequency (50/60 Hz in Japan) component from AC power supplied externally through the charging cable 4 and outputs the component to the full wave rectification circuit 42. The full wave rectification circuit 42 performs full-wave rectification on AC power input from the input filter 41 and outputs the resultant to the PFC circuit 43. The full wave rectification circuit 42 is formed by, for example, a diode bridge circuit. The PFC circuit 43 improves the power factor of DC power that is input from the full wave rectification circuit 42 and outputs the improved DC power to the DC-DC converter 44.

The DC-DC converter 44 is a power supplying unit that converts the DC power that is input from the PFC circuit into DC power having a predetermined voltage or a predetermined current and supplies the DC power to the battery E1. The DC-DC converter 44 is formed of, for example, an insulation type full bridge DC-DC converter, an insulation type flyback DC-DC converter, or the like.

The control unit 45 can be realized by the cooperation of hardware resources and software resources or only by hardware resources. As the hardware resources, a microcomputer, DSP, FPGA, ROM, RAM, and other LSIs can be used. As the software resources, firmware and other programs can be used. The control unit 45 controls on/off of a switching element included in the PFC circuit 43 and the DC-DC converter 44 so as to control the charging current/charging voltage from the DC-DC converter 44 to the battery E1. Increasing the on time of the switching element included in the DC-DC converter 44 can increase the charging current/charging voltage into the battery E1, and decreasing the on time can decrease the charging current/charging voltage into the battery E1.

In the case of constant current (CC) charging, the control unit 45 controls the duty of the switching element such that the output current of the DC-DC converter 44 maintains a specified current value. In the case of constant voltage (CV) charging, the control unit 45 controls the duty of the switching element such that the output voltage of the DC-DC converter 44 maintains a specified voltage value. In the present embodiment, pulse charging in which the burden on the battery E1 is lighter compared to constant current charging is introduced.

When performing pulse charging, the control unit 45 adjusts the unit on time and unit off time of a pulse based on the temperature of the battery E1 acquired from the management unit 14. More specifically, the width of the unit on time and the width of the unit off time are extended as the temperature of the battery E1 becomes lower.

Figure 3A:
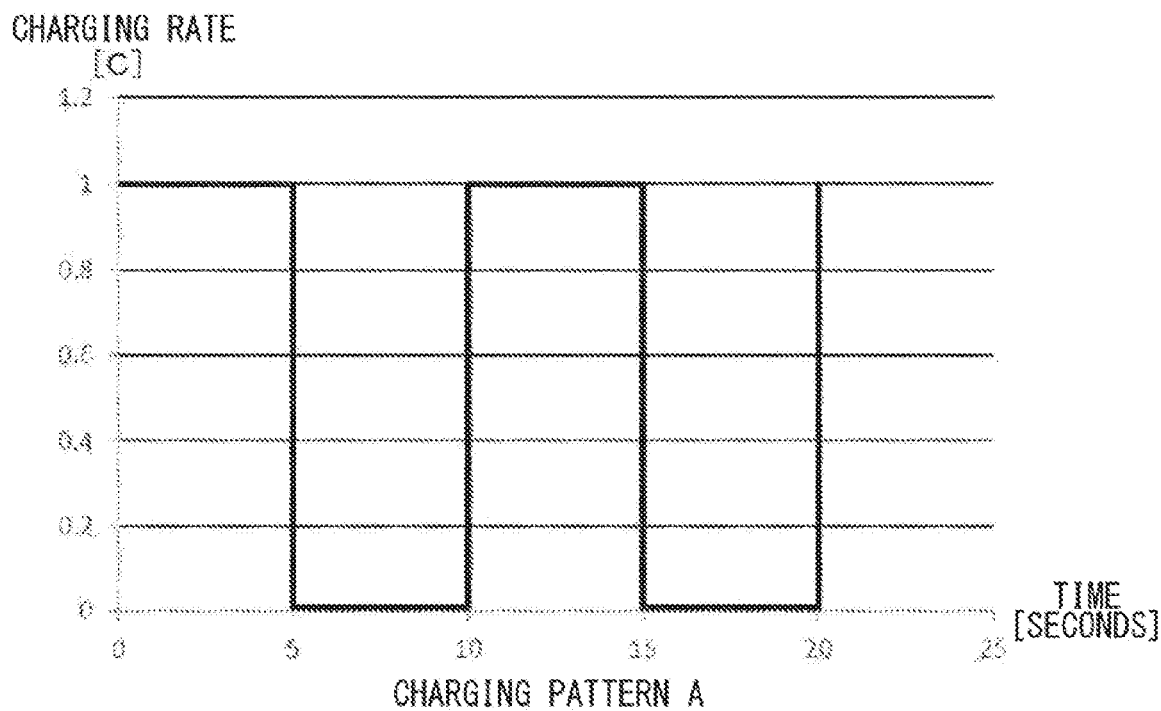
FIGS. 3A and 3B are diagrams showing an example of a pulse charging pattern at a low temperature and an example of a pulse charging pattern at a high temperature.
Figure 3B:
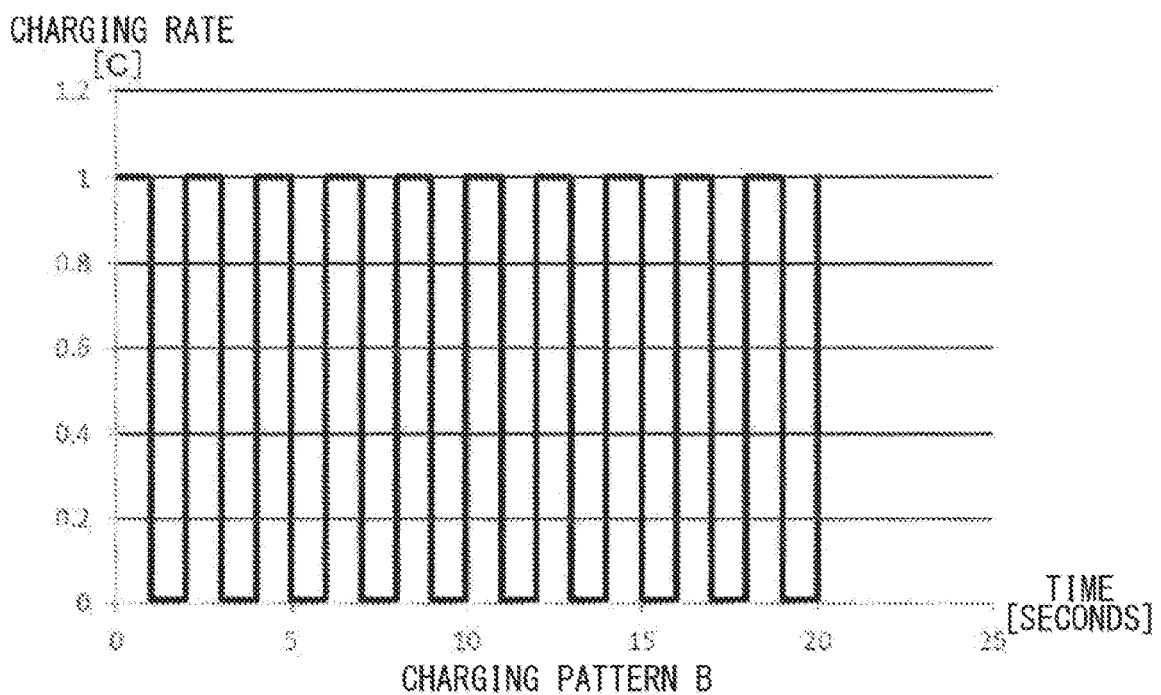

FIGS. 3A and 3B are diagrams showing an example of a pulse charging pattern at a low temperature and an example of a pulse charging pattern at a high temperature. FIG. 3A shows a charging pattern A at a low temperature (25° C.), and FIG. 3B shows a charging pattern B at a high temperature (45° C.). The examples shown in FIGS. 3A and 3B are examples of charging with a current value of 1 C and a duty of 50%. In the charging pattern A at the low temperature, the on time and off time of a pulse are set to 5 times those of the charging pattern B at the high temperature, respectively. The charging time required for full charging is the same between the charging pattern A at the low temperature and the charging pattern B at the high temperature.

When the unit on time of the pulse is referred to as t1, and the unit off time of the pulse is referred to as t2, the ratio t2/t1 of the unit off time t2 to the unit on time t1 is set in a range of 0.05≤t2/t1≤1.0. The examples shown in FIGS. 3A and 3B are examples in which the ratio t2/t1 is set to 1.0, and the charging time is the longest in this case. The charging time is the shortest when the ratio t2/t1 is set to 0.05.

In this embodiment, it is assumed that the battery is fully charged within at least 6 hours. Therefore, the current value during the charging is set in a range of 0.2 to 2 C. If the charging is performed with a current value of less than 0.2 C, the burden on the battery is reduced even in the case of constant current charging.

Figure 4A:
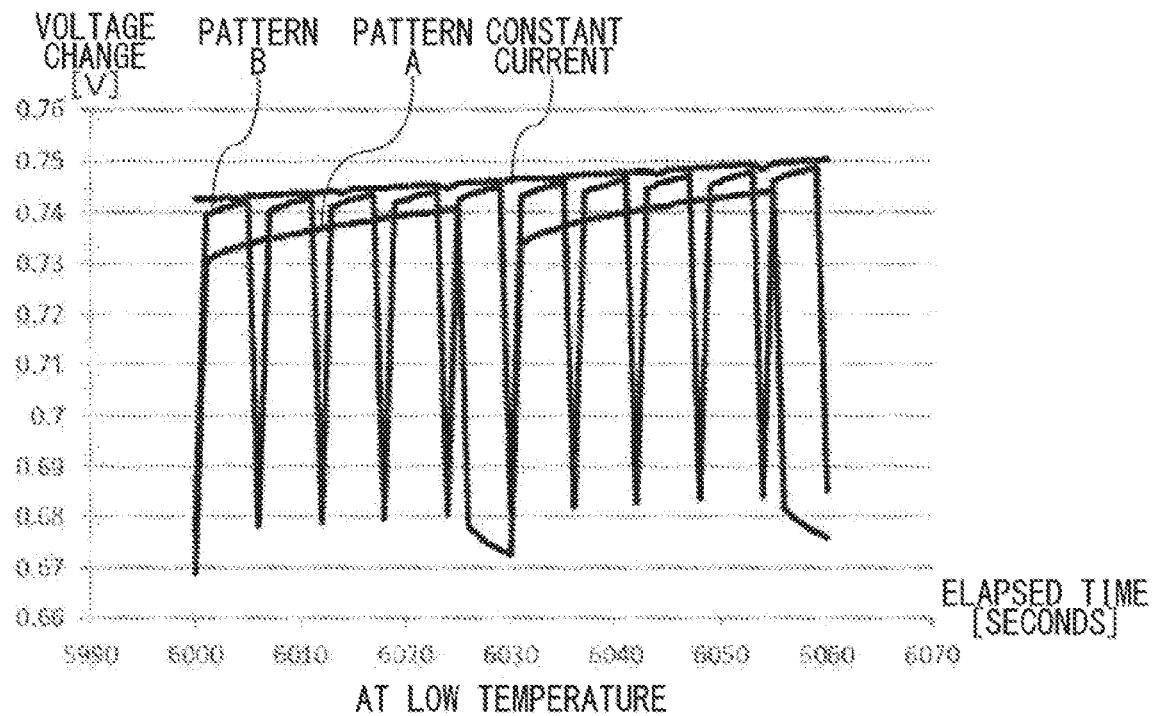
FIGS. 4A and 4B are diagrams showing an example of the behavior of voltage change from the initial voltage at low temperature and an example of the behavior of voltage change from the initial voltage at high temperature, at the end of charging.
Figure 4B:
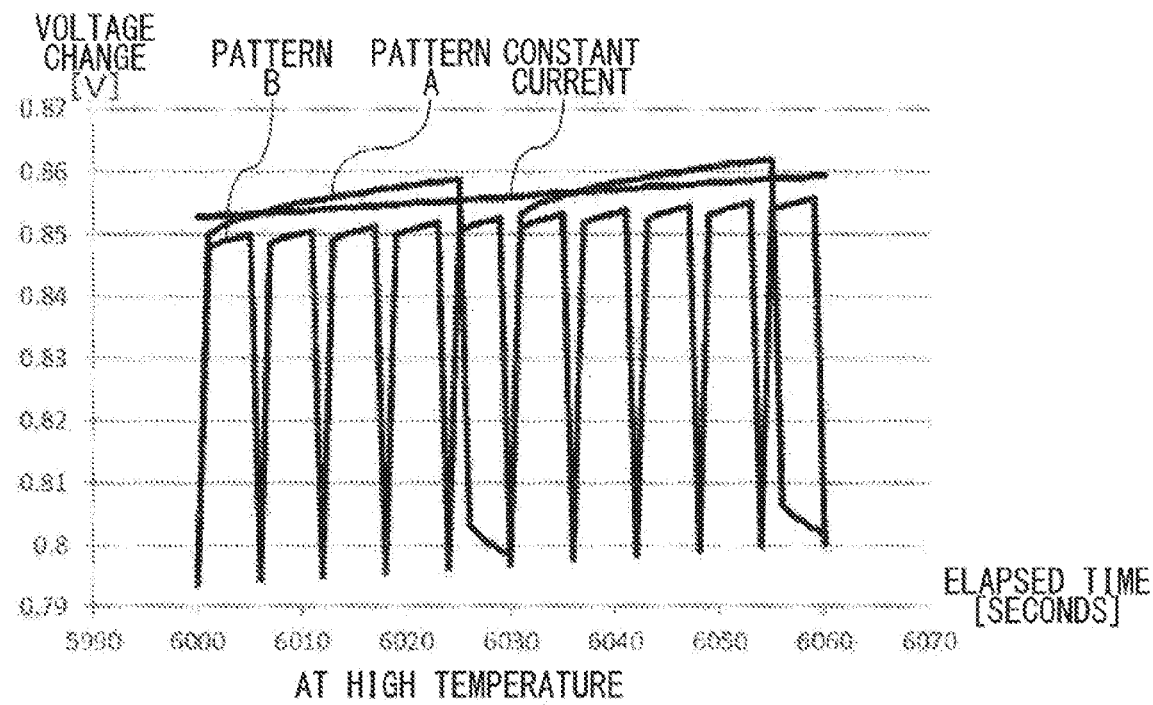

FIGS. 4A and 4B are diagrams showing an example of the behavior of voltage change from the initial voltage at low temperature and an example of the behavior of voltage change from the initial voltage at high temperature, at the end of charging. FIG. 4A shows the behavior of voltage changes in constant current charging, charging according to the charging pattern A, and charging according to the charging pattern B at a low temperature (25° C.). FIG. 4B shows the behavior of voltage changes in constant current charging, charging according to the charging pattern A, and charging according to the charging pattern B at a high temperature (45° C.). In the examples shown in FIGS. 4A and 4B, the ratio t2/t1 of the unit off time t2 to the unit on time t1 during charging according to the charging pattern A and the ratio t2/t1 during charging according to the charging pattern B are both set to 0.25.

The lower the voltage, the smaller the polarization and the less the deterioration of the active material. The influence of the deterioration is clearly different between low temperature and high temperature even under the same charging pattern. The diffusion of lithium ions depends on the temperature, and the diffusion speed increases as the temperature increases and decreases as the temperature decreases. Further, the polarization resistance depends on the temperature and becomes lower as the temperature increases and becomes higher as the temperature decreases.

When the unit on time (energization time) of pulse charging is increased, self-heating due to Joule heat increases, and the battery temperature thus rises. This lowers the polarization resistance and lowers the battery voltage. This voltage drop contributes to the suppression of battery deterioration. As shown in FIG. 4A, the battery voltage is lower in the charging pattern A than in the charging pattern B at the low temperature. This indicates that the charging pattern A has less burden on the battery than the charging pattern B. The charging time of the charging pattern A is slightly longer than that of the charging pattern B. However, the increase in the charging time is less than 1% of the battery capacity.

Further, the diffused lithium ions attempt to return to the normal position during the unit off time (pause time) of the pulse charging. However, since the movement of the lithium ions slows down at low temperature, there are ions that cannot completely return to the normal position. Therefore, by increasing the unit off time (pause time) at low temperature, the time for the lithium ions to return to the normal position is increased. By increasing the unit on time (energization time) and the unit off time (pause time) at low temperature as described above, a homogeneous reaction can be promoted. If the unit off time (pause time) is too short, the effect of promoting the homogeneous reaction cannot be obtained. Therefore, in this embodiment, the minimum value of the unit off time (pause time) is set to one second.

Figure 5A:
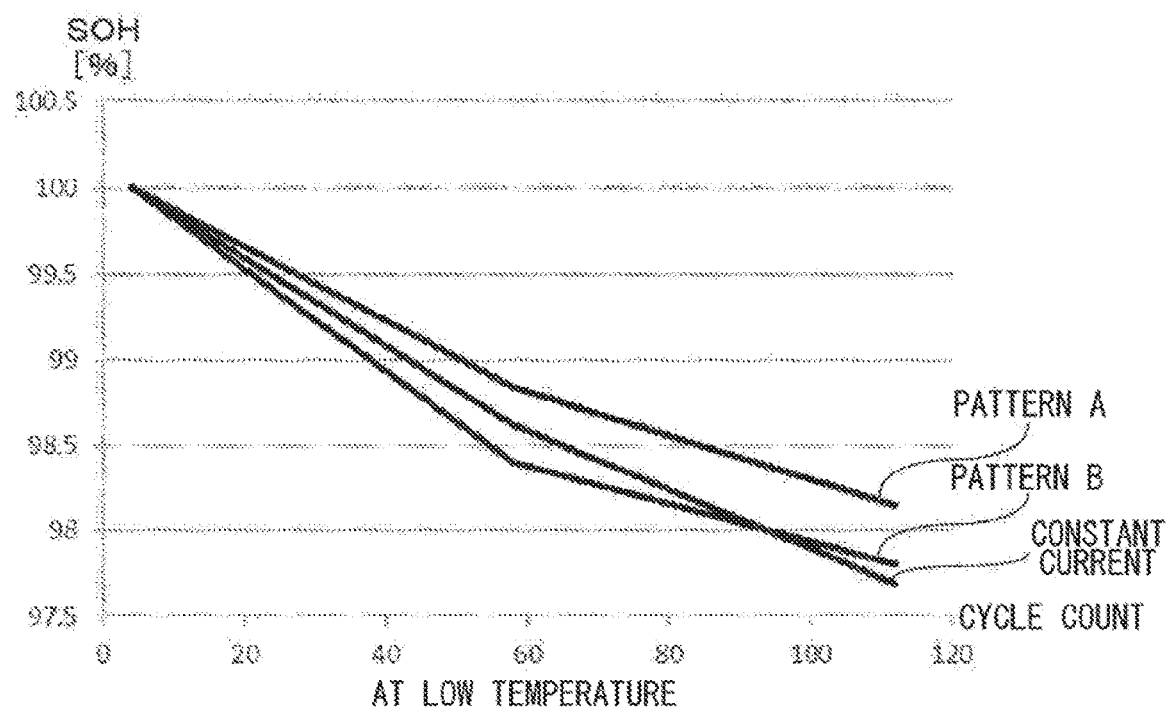
FIGS. 5A and 5B are diagrams showing an example of cycle characteristics of a battery at a low temperature and an example of cycle characteristics of a battery at a high temperature.
Figure 5B:
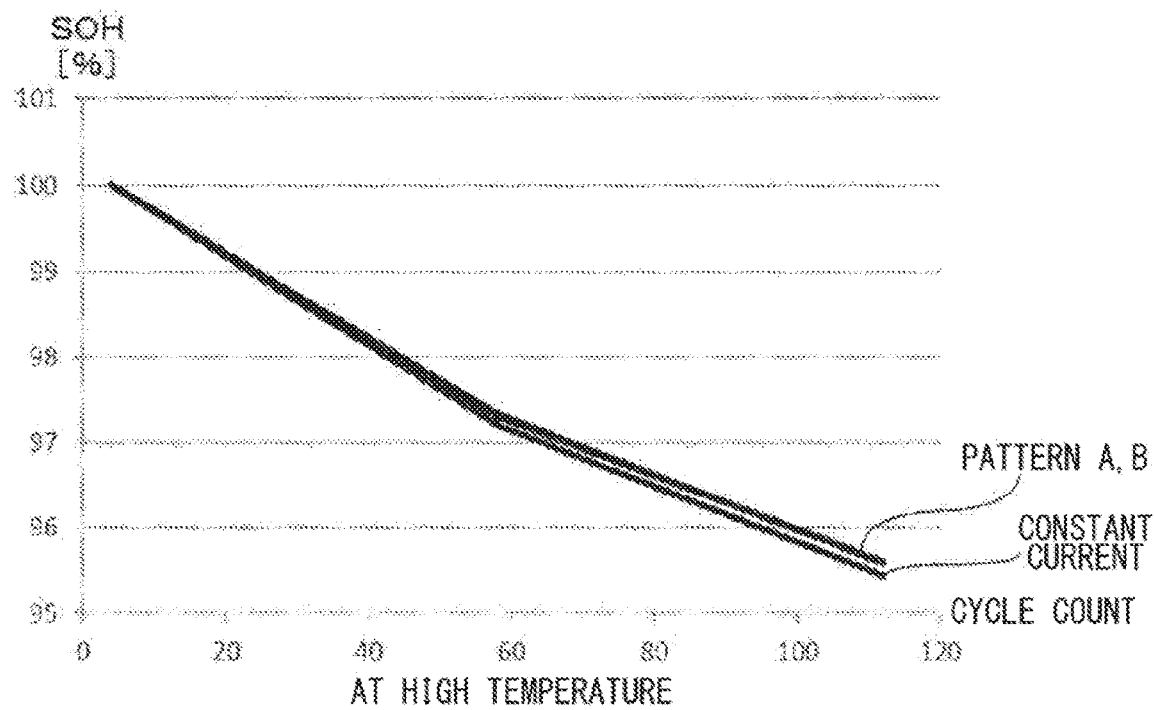

FIGS. 5A and 5B are diagrams showing an example of cycle characteristics of a battery at a low temperature and an example of cycle characteristics of a battery at a high temperature. FIG. 5A shows the cycle characteristics of constant current charging, charging according to the charging pattern A, and charging according to the charging pattern B at a low temperature (25° C.). FIG. 5B shows the cycle characteristics of constant current charging, charging according to the charging pattern A, and charging according to the charging pattern B at a high temperature (45° C.). The state of health (SOH) on the vertical axis indicates a capacity maintenance rate with respect to the initial capacity and indicates that the closer to 100%, the less the deterioration.

When the temperature is high, there is almost no difference in the cycle characteristics between the charging pattern A and the charging pattern B as shown in FIG. 5B. However, when the temperature is low, the cycle characteristics are improved more in the charging pattern A than in the charging pattern B as shown in FIG. 5A. It can be found that the deterioration of the battery is suppressed by increasing the unit on time (energization time) and the unit off time (pause time) at low temperature as described above.

When the unit on time at a first temperature is set as $t1*c1$, the unit off time at the first temperature is set as $t2*c1$, the unit on time at a second temperature that is higher than the first temperature is set as $t1*c2$, and the unit off time at the second temperature is set as $t2*c2$, a relationship $c1>c2$ is set. The first temperature and the second temperature indicate a relative relationship between the two temperatures and do not indicate absolute values.

The temperatures are classified into a plurality of intervals (for example, in increments of 5° C.), and a coefficient c is set for each interval. The relationship between each temperature interval and the coefficient c is mapped to a table and stored in advance in a memory in the control unit 45. The relationship between each temperature interval and the coefficient c is different for each type of battery. The designer can determine the coefficient c of each temperature interval of a battery to be used based on experiments and simulations. The relationship between the battery temperature and the coefficient c may be defined using a function instead of a map.

The control unit 45 may execute the pulse charging over the entire period from the start of charging to the end of charging or during a part of the period. Constant current charging is performed during the period when the pulse charging is not performed. For example, the pulse charging may be performed from the start of the charging, and switching to constant current charging may be performed once the temperature of the battery E1 reaches a predetermined temperature. As shown in FIG. 5B, when the temperature is high, the difference in the burden on the battery is small between the pulse charging and the constant current charging.

Normally, as time elapses from the start of the charging, the temperature of the battery E1 rises due to the influence of Joule heat. Therefore, when the pulse charging is performed over the entire period, the width of the unit on time and the width of the unit off time are gradually reduced. The pulse charging may be performed over the entire period according to the width of the unit on time and the width of the unit off time that are based on the temperature of the battery E1 at the time of the start of the charging.

Further, the control unit 45 may start charging using a constant current and switch the charging to the pulse charging at the time when the positive electrode material or the negative electrode material undergoes phase transition. The time when the phase transition occurs can be estimated by detecting the state of charge (SOC) of the cell of the battery E1. The SOC of the cell can be estimated by a current integration method using the voltage at the start of the charging as an initial value. The SOC of the cell can also be estimated by measuring the open circuit voltage (OCV) of the cell. The control unit 45 estimates the SOC of the cell based on the voltage value and current value of the cell acquired from the management unit 14.

The SOC that causes the phase transition has been determined by the material, and the control unit 45 identifies the time when the phase transition has occurred based on the SOC of the cell. When the phase transition occurs, the battery E1 is easily deteriorated. Therefore, the constant current charging is switched to the pulse charging that imposes a lighter burden on the battery E1.

As described above, according to the present embodiment, by performing pulse charging using an appropriate charging pattern according to the temperature of the battery E1, heterogeneous reactions and side reactions at the end of charging can be suppressed, and the deterioration of the battery E1 can thus be suppressed. By optimally adjusting the width of the unit on time and the width of the unit off time according to the temperature of the battery E1, lithium ion diffusion can be optimized and charging unevenness can be eliminated.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

In the above-described embodiment, the example has been described where AC power is supplied from the charger 3 to the vehicle 1 via the charging cable 4. With regard to this point, DC power may be supplied from the charger 3 to the vehicle 1 via the charging cable 4. In that case, the charging unit 40 in the vehicle 1 is provided inside the charger 3. The charging cable 4 needs to include a communication line for connecting the management unit 14 in the vehicle 1 and the charging unit 40 in the charger 3. The management unit 14 in the vehicle 1 and the charging unit 40 in the charger 3 may be connected wirelessly.

Figure 6:
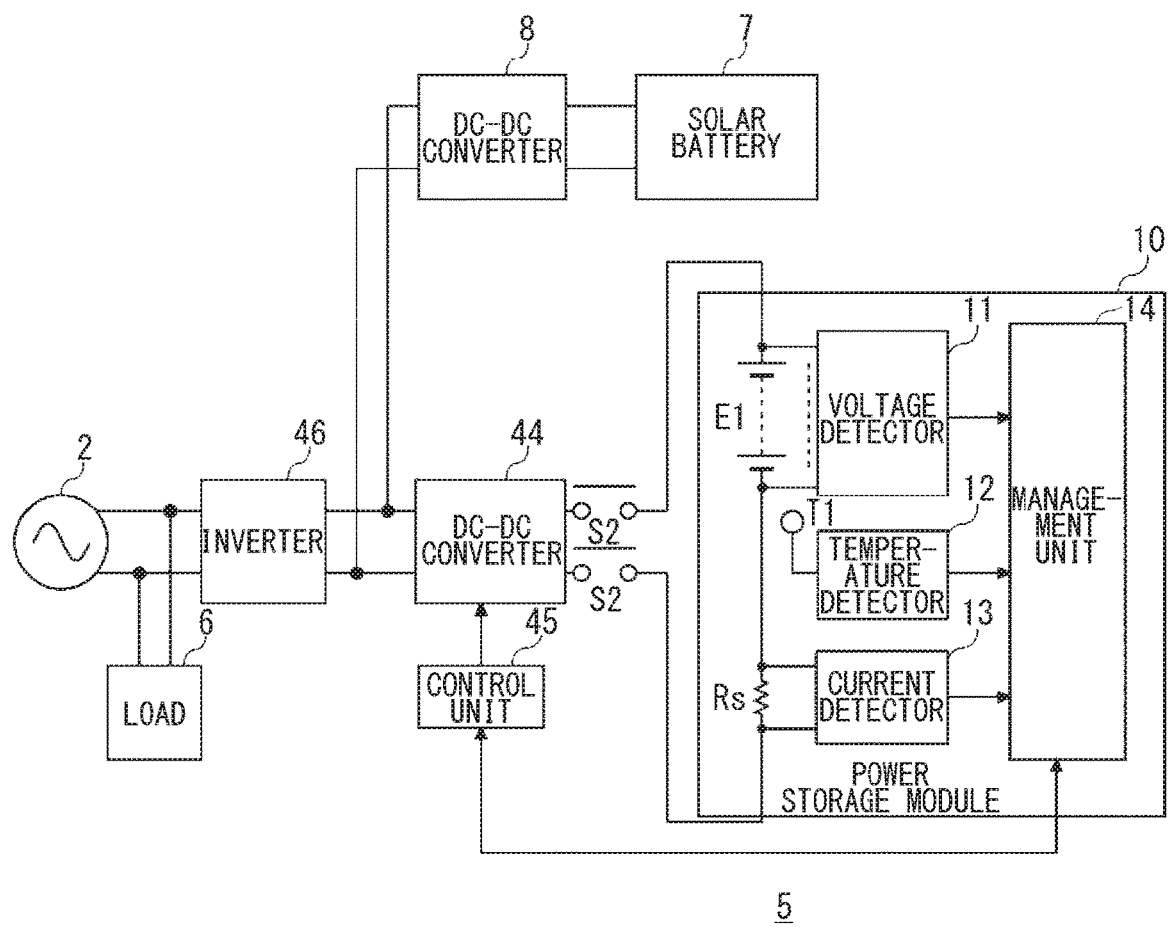
FIG. 6 is a diagram for explaining a power storage system according to an exemplary variation.

FIG. 6 is a diagram for explaining a power storage system 5 according to an exemplary variation. In the above-described embodiment, the example has been described where the battery E1 is used for in-vehicle use. In the exemplary variation, an example where the battery E1 is used for stationary power storage applications will be described. The power storage system 5 includes a power storage module 10, a DC-DC converter 44, a control unit 45, an inverter 46, and a second switch S2. The DC-DC converter 44 and the control unit 45 constitute a power supplying device as a single functional unit for charging the battery E1. The circuit structure of the power storage module 10, the DC-DC converter 44, the control unit 45, and the second switch S2 is the same as the circuit structure shown in FIG. 1.

In the exemplary variation, an inverter 46 is connected between the DC-DC converter 44 and the system 2. A load 6 is connected to a distribution line connecting the inverter 46 and the system 2. The inverter 46 converts AC power supplied from the system 2 into DC power and supplies the DC power to the DC-DC converter 44. The inverter 46 converts the DC power supplied from the DC-DC converter 44 into AC power and supplies the AC power to the load 6 and/or the system 2. The power storage system 5 can be used for peak shift and backup. The control unit 45 can reduce the burden on the battery E1 during charging by performing the above-described pulse charging and can thus extend the life of the battery E1.

Another DC power source can be connected to a DC bus between the inverter 46 and the DC-DC converter 44. In the example shown in FIG. 6, a solar power generation system is connected. The solar power generation system includes a solar battery 7 and a DC-DC converter 8. The DC-DC converter 8 boosts DC power generated by the solar battery 7 and then outputs the DC power to the DC bus. The DC-DC converter 44 can also charge the battery E1 with DC power generated by the solar battery 7.

In the above-described embodiment, an example has been described where a lithium ion battery is used as the battery E1. With regard to this point, another chemical battery such as a nickel hydride battery, a nickel cadmium battery, or a lead battery may be used as the battery E1. These chemical batteries also show the same tendency as lithium ion batteries.

The embodiment may be specified by the following items.

[Item 1]

A power supplying device (40) including:

a power supplying unit (44) that charges a battery (E1); and a control unit (45) that controls the power supplying unit (44) so as to charge the battery (E1) in a pulsed manner in at least a part of a charging period of the battery (E1), wherein the control unit (45) extends a unit on time and a unit off time when charging the battery (E1) in the pulsed manner, as the temperature of the battery (E1) becomes lower.

According to this, it is possible to reduce the burden on the battery (E1) when charging the battery (E1) in the pulsed manner.

[Item 2]

The power supplying device (40) according to Item 1, wherein the minimum value of the unit off time is one second.

According to this, the effect of promoting a homogeneous reaction can be obtained by providing a pause period of one second or more.

[Item 3]

The power supplying device (40) according to Item 1 or 2, wherein a ratio t2/t1 of the unit off time t2 to the unit on time t1 is set in a range of $0.05 \leq t2/t1 \leq 1.0$.

According to this, it is possible to achieve a balance between charging time and the protection of the battery (E1).

[Item 4]

The power supplying device (40) according to any one of Items 1 through 3, wherein the control unit (45) starts the charging by constant current charging and switches the charging to the charging in the pulsed manner when a positive electrode material or a negative electrode material of the battery (E1) undergoes phase transition.

According to this, the burden on the battery (E1) can be reduced by switching the charging to the charging in the pulsed manner after the phase transition.

[Item 5]

A power storage system (5) including:

a battery (E1); and the power supplying device (40) according to any one of Items 1 through 4.

According to this, it is possible to construct a power storage system (5) that can reduce the burden on the battery (E1) when charging the battery (E1) in the pulsed manner.

[Item 6]

The power storage system (5) according to Item 5, wherein a positive electrode active material of the battery (E1) is a lithium nickel composite oxide having a high Ni ratio.

According to this, the burden on the battery (E1) using the positive electrode active material can be reduced.

[Item 7]

The power storage system (5) according to Item 5 or 6, wherein a negative electrode active material of the battery (E1) is a carbon material, silicon, a silicon compound such as silicon oxide, or a lithium alloy containing at least one element selected from the group consisting of tin, aluminum, zinc, and magnesium.

According to this, the burden on the battery (E1) using the negative electrode active material can be reduced.

[Item 8]

A charging method for charging a battery (E1) in a pulsed manner in at least a part of a charging period of the battery (E1) when charging the battery (E1), comprising:

extending a unit on time and a unit off time when charging the battery (E1) in the pulsed manner as the temperature of the battery (E1) becomes lower.

According to this, it is possible to reduce the burden on the battery (E1) when charging the battery (E1) in the pulsed manner.

REFERENCE SIGNS LIST 1 vehicle
E1 battery
T1 temperature sensor
S1 first switch
2 system
S2 second switch
3 charger
4 charging cable
5 power storage system
6 load
Rs shunt resistor
7 solar battery
8 DC-DC converter
10 power storage module
11 voltage detector
12 temperature detector
13 current detector
14 management unit
20 inverter
30 motor
40 charging unit
41 input filter
42 full wave rectification circuit
43 PFC circuit
44 DC-DC converter
45 control unit
46 inverter

The invention claimed is:

1. A power supplying device comprising:
a power supplying unit that charges a battery; and
a control unit that controls the power supplying unit so as to charge the battery by pulse charging, in at least a part of a charging period of the battery;
wherein the control unit is configured to:
estimate a state of charge of a cell in the battery;
determine that a phase transition occurs based on the state of charge of the cell; and
start charging the battery by constant current charging, and switch from the constant current charging to the pulse charging in response to determining that a positive electrode material or a negative electrode material of the battery undergoes the phase transition, and
wherein the control unit is configured to extend a unit on time and a unit off time when charging the battery by the pulse charging, as a temperature of the battery becomes lower.

2. The power supplying device according to claim 1, wherein the minimum value of the unit off time is one second.

3. The power supplying device according to claim 1, wherein a ratio t2/t1 of the unit off time t2 to the unit on time t1 is set in a range of $0.05 \leq t2/t1 \leq 1.0$.

4. A power storage system comprising:
a battery; and
a power supplying device comprising:
a power supplying unit that charges a battery; and
a control unit that controls the power supplying unit so as to charge the battery by pulse charging, in at least a part of a charging period of the battery;
wherein the control unit is configured to:
estimate a state of charge of a cell in the battery;
determine that a phase transition occurs based on the state of charge of the cell; and
start charging the battery by constant current charging, and switch from the constant current charging to the pulse charging in response to determining that a positive electrode material or a negative electrode material of the battery undergoes the phase transition, and
wherein the control unit is configured to extend a unit on time and a unit off time when charging the battery by the pulse charging, as a temperature of the battery becomes lower.

5. The power storage system according to claim 4, wherein a positive electrode active material of the battery is a lithium nickel composite oxide.

6. The power storage system according to claim 4, wherein a negative electrode active material of the battery is a carbon material, silicon, a silicon compound, or a lithium alloy containing at least one element selected from the group consisting of tin, aluminum, zinc, and magnesium.

7. A charging method for charging a battery by pulse charging in at least a part of a charging period of the battery when charging the battery, comprising:
estimating a state of charge of a cell in the battery;
determining that a phase transition occurs based on the state of charge of the cell; and
starting charging the battery by constant current charging, and switching from the constant current charging to the pulse charging in response to determining that a positive electrode material or a negative electrode material of the battery undergoes the phase transition; and
extending a unit on time and a unit off time when charging the battery by the pulse charging as a temperature of the battery becomes lower.

* * * * *